2,791,518
Patented May 7, 1957

2,791,518

PROCESS FOR MAKING A MICROBICIDAL ARTICLE

Thomas A. Stokes, Jr., and Fred W. Davis, Lake Worth, Fla., assignors, by mesne assignments, to Permachem Corporation, West Palm Beach, Fla., a corporation of Florida No Drawing. Application March 21, 1955,
Serial No. 495,766

26 Claims. (Cl. 117—120)

This invention relates to a method useful in treating an article to render it microbicidal to microorganisms coming in contact with its surface, particularly to a method for depositing economically on the surface of or within the interstices of an article a mixture comprising a substantially water-insoluble silver salt and another substantially water-insoluble compound effective as a light screen to protect the silver salt from the action of light normally tending to discolor it.

The treatment of articles, such as those made of synthetic organic resins, paper, leather, textiles, felt and other fibrous and non-fibrous products, to impart microbicidal properties to them whereby they would be lethal over long periods of time to bacteria and fungi coming into contact with them has long presented a problem for which no entirely satisfactory process has heretofore been disclosed. It is known that such articles, especially paper, fabrics and other cellulosic fibrous articles, can be impregnated or treated with certain types of microbicidal agents to maintain them in a sterile condition for short periods of time. A number of conventional germicides and fungicides have been proposed for such purposes. Bandages supporting germicides on the fibers and in the interstices between the fibers have been prepared which could be stored in the open air without becoming unduly contaminated with microorganisms and which could be applied subsequently to open wounds without danger of carrying air-borne infections into the wound. Even this process has, however, not been entirely satisfactory for a number of reasons and has not been used on a wide scale.

Most of the attempts made heretofore to render articles microbicidal have been confined to the treatment of bandages, surgical gauze and similar fibrous articles for the reason that such articles must of necessity be maintained in a strictly sterile condition until such time as they are used. There are many other instances, however, where the provision of an article which has been treated in such a way as to render it more or less permanently toxic to bacteria and fungi coming into contact with its surface would be highly advantageous. Not only would a treatment whereby this could be accomplished easily and economically be of value in connection with health problems to prevent the spread of disease and the like by the handling of such articles by different persons, but the avoidance of the deteriorating and destructive effects of the microorganisms on the articles themselves leading to molding, mildew, decay and the like would be avoided. The large annual loss, in terms of money, of cellulosic and other products subject to decay from bactericidal or fungicidal causes is well known.

It is apparent that, to be of more than limited applicability in restricted fields, a process for treating articles to render them microbicidal must of necessity be such that the article retains its microbicidal properties as nearly permanently as possible. In particular, treated articles to be used out of doors should not lose their microbicidal properties by exposure to sunlight, rain and other weather conditions. Articles which must be cleaned and laundered frequently should not lose their microbicidal properties during cleaning or laundering. In addition, there are certain aspects relating to the appearance of the treated article which must be taken into account. Any treatment which changes the color or weight of the article, e. g., of a fabric or paper, or which otherwise alters its appearance would obviously be unsatisfactory in many instances. Not only should the appearance of the article suffer as little change as possible during the actual treatment, but any subsequent change in appearance even after long storage or use should be avoided as much as possible. Odorous substances cannot be tolerated in a majority of instances. It is thus apparent that the problem involved is highly complex and that a simple, inexpensive method for accomplishing the purposes outlined, while at the same time avoiding in great measure the difficulties mentioned, is not to be found readily.

The many attempts which have been made to accomplish the desirable results referred to are known in the art and need not be reviewed here. In particular, however, attention is directed to the numerous attempts which have been made to utilize silver compounds in the treatment of articles to give them microbicidal properties, especially bactericidal properties. The effective bactericidal properties and the generally non-corrosive nature of many types of silver compounds would indicate that these substances should find utility in this field. Little success has been attained, however, in this utilization of silver compounds because of their almost universal property of becoming colored when exposed to light over a period of time. White fabrics, for example, treated or impregnated with silver salts by most of the known methods acquire a greyish, bluish or even a darker shade of color after exposure to the light. Most colored articles when so treated suffer a distinct change in shade upon exposure to light. Such shades are often particularly displeasing to the eye and, of course, no change in color can be tolerated when a permanently uncolored article is desired.

In United States Patent No. 2,689,809 there is described and claimed a process for treating articles to form on the surfaces thereof a tightly adherent, germicidal, co-precipitated coating or deposit of a substantially water-insoluble silver halide or phosphate and a substantially water-insoluble salt of a metal other than silver. The latter salt functions, presumably because of its intimate admixture with the silver salt, as an effective stabilizer of the silver salt against the effect of light normally tending to discolor it. The process of U. S. Patent No. 2,689,809 is effected by first wetting the article which is to be treated with a first aqueous solution comprising a water-soluble silver salt and a water-soluble salt of a metal other than silver. In a typical instance the first solution contains silver nitrate and barium nitrate. The article is subsequently wetted with a second aqueous solution which comprises a water-soluble halide or phosphate and a water-soluble salt, which may also be a phosphate, the anion of which forms a water-insoluble compound with the cation of the metal other than silver in the first solution. In a typical instance the second solution contains sodium chloride and sodium phosphate. The second solution also contains a water-soluble basic nitrogen compound, such as ammonia or an amine, an aqueous solution of which is capable of dissolving the water-insoluble silver compound, e. g. silver chloride. The article is then treated, e. g. dried, to remove the free basic nitrogen compound.

By this procedure there is deposited on the article a co-precipitated mixture of a silver halide or phosphate and another water-insoluble compound comprising the cation of the metal other than silver from the first solution and an anion of a salt from the second solution. In the typical instance referred to, the co-precipitate comprises silver chloride and barium phosphate.

This process, however, suffers from certain disadvantages. There is left deposited on the surface of the article, along with the desired co-precipitate, the water-soluble compounds resulting from the reactions of the constituents of the two solutions to form the co-prepicitated salts. In the above typical instance sodium nitrate is left deposited on the article along with the co-precipitate. Inasmuch as the first solution must contain at least two species of metal cations and the second solution usually contains two species of anions, there are often a number of different water-soluble substances remaining on the surface of the article after drying. These soluble substances must, in many instances, subsequently be removed from the treated article by washing, which adds considerably to the complexity and cost of the process.

In addition, it is apparent that, since the article is wetted first with the solution containing a soluble silver salt and later on with the second solution containing a basic nitrogen compound, and since the latter effectively retards or even prevents precipitation of the insoluble silver salt on the article until at least a considerable proportion of the basic nitrogen compound has been removed from the wetted article by evaporation or by other means, there will be a considerable tendency for the soluble silver salt contained in the portion of the first solution which adheres to the article to be leached from the article by the second solution and thus to be removed effectively from the zone of co-precipitation so that it becomes ineffective insofar as treating the article is concerned. This difficulty is particularly noticeable when the wetting operations are carried out by dipping the article in the respective solutions, a considerable proportion of the silver originally in the first solution appearing eventually in the second solution from which it must be recovered for reuse.

It is also apparent that the process has certain practical limitations because of the necessity of having both the first and second solutions remain clear prior to use. For this reason, no anions of a water-insoluble silver salt can be included in the first solution and no mixture of cations and anions of a salt which is insoluble in the aqueous basic nitrogen compound of the second solution can be included therein. Besides restricting undesirably the choice of the various compounds which can be used in the process, these limitations also increase the number of substances which must be employed in the process over the number which would appear to be required if a more favorable process were known.

It is apparent that any process which would produce a treated article substantially the same as or superior to that produced by the process of U. S. Patent No. 2,689,809, but which would at the same time be less costly to operate and which would overcome at least some of the disadvantages of the process which have been noted, would be of great value.

It has now been found that many of the disadvantages of the process just discussed can be overcome, and that certain additional advantages can be realized, by treating an article which it is desired to render antiseptic and self-sterilizing according to the process herein first described which differs basically from that of U. S. Patent No. 2,689,809.

In carrying out the new process, the article to be treated is wetted first with an aqueous solution, herein referred to as a "first" aqueous solution, which comprises a water-soluble basic nitrogen compound and a silver salt which is soluble in the aqueous basic nitrogen compound. The article is then wetted or treated, without removal of the basic nitrogen compound from it, with another aqueous solution, herein referred to as a "second" aqueous solution, comprising a water-soluble salt, the nature of which will be apparent as the description proceeds. The compounds dissolved in the first and second solutions are selected in such fashion that one of the solutions comprises the anion of a substantially water-insoluble silver salt. In addition, one of the solutions comprises a metal cation other than silver of a substantially water-insoluble salt while the other solution comprises the anion of the same substantially water-insoluble salt of the metal other than silver.

When the article to be treated is wetted with the first aqueous solution and then, without removing the basic nitrogen compound from the solution adhering to or remaining on the article, with the second solution, there remains on the article and in contact with the surfaces thereof a mixture of the solutions comprising the basic nitrogen compound and the cations and anions of both the substantially water-insoluble silver salt and the substantially water-insoluble salt of the metal other than silver. Removal of all or a major proportion of the basic nitrogen compound, usually by drying accompanied by the removal of water, from the article, thus insures the completion of the co-precipitation of the two substantially water-insoluble salts on the surfaces of and in the interstices of the article in the form of the desired adherent coating or deposit.

Following the removal of the basic nitrogen compound and, if desired, of water from the treated article, the article can be washed to remove any water-soluble salts or other components which may be present or which may have been deposited along with the co-precipitate. The article can then be dried in normal fashion.

The new process offers great advantages over hitherto described processes in the way of flexibility in the choice of substances which can be used in formulating the two solutions. Because of the fact that the basic nitrogen compound is included in the first aqueous solution, i. e., in the same solution as the silver compound utilized as the source of the silver, the choice of silver salt which can be used is not limited to the water-soluble silver salts. It is known that a great many silver salts which are normally insoluble or only slightly soluble in water are readily soluble in aqueous solutions of basic nitrogen compounds, especially in aqueous solutions of ammonia or the water-soluble amines. Because of this property, the choice of the silver salt which can be utilized is widened greatly with the consequent possibility of choosing a specific silver salt with a greater emphasis on economy and ready availability than is possible when the basic nitrogen compound is not included in the same solution as the silver compound. As a matter of fact, it is frequently desirable to utilize as the source of silver the identical silver salt, such as the halide or phosphate, which it is desired to co-precipitate with another insoluble salt on the surface of the article being treated. This offers the advantage that the same starting material supplies both the cation and anion of the substantially water-insoluble silver salt and this generally reduces by at least one the number of different materials or substances which must be employed in operating the process. The invention is, however, not limited to the employment in the first aqueous solution of a substantially water-insoluble silver salt, but only to the employment therein of a silver compound which is soluble in the aqueous basic nitrogen compound.

An additional advantage of the process is that it permits selecting the other ingredients used in making up the solutions with a greater degree of latitude than heretofore possible, it being only essential that the metal cation other than silver of the substantially water-insoluble salt which is to be co-precipitated with the substantially water-insoluble silver salt be contained in either one of the first or second solutions and that the anion of the same salt be contained in the other of the two solutions. Because of the presence of the basic nitrogen compound in the first solution along with the silver compound, it is possible to include the anion of a substantially water-insoluble compound of a metal other than silver along with the silver in the first solution, if desired, even though the silver compound formed with the anion is insoluble or only slightly soluble in water. This offers the further possibility, when desirable, of reducing to only two the number of individual compounds, other than the basic nitrogen compound and water, which it is necessary to use in making up the two solutions except in those instances where a large excess on a chemically equivalent basis of the substantially water-insoluble compound of the metal other than silver over the substantially water-insoluble silver compound is desired in the co-precipitate.

For example, it is possible to dissolve the basic nitrogen compound, e. g. ammonia, and silver sulfate in water to make the first solution and to dissolve barium chloride in water to make the second solution. When the process is carried out using such solutions, and using the silver sulfate and barium chloride in chemically equivalent proportions, the co-precipitate obtained consists of silver chloride and barium sulfate. Under such circumstances, the co-precipitate is substantially free of water-soluble substances and any necessity for washing the article to remove such soluble substances is avoided, the entire process consisting only of wetting the article with the first solution, then with the second solution and drying it.

Although the advantages of carrying out the process in the manner just described, e. g. when using silver sulfate and barium chloride in the respective solutions, can be seen readily, it should be pointed out, as will be explained more fully later, that it is generally necessary to form the co-precipitate in such fashion that the actual amount of the substantially water-insoluble salt of the metal other than silver is more than equivalent chemically to the actual amount of the substantially water-insoluble silver salt. Under such circumstances, there generally remains associated with the co-precipitate a considerable proportion of a water-soluble salt or salts as a result of the ionic reactions involved, which it is preferable to remove eventually from the treated article by washing.

As indicated previously, substantially any silver salt can be used as the source of silver in preparing the first solution, due regard being given, of course, to any adverse effects which the anion of the particular compound employed might have on the particular article being treated. Thus, for example, it is known that the chromate ion is yellow and the use of silver chromate as the starting salt should be avoided when all color is to be avoided. The anions of certain other silver salts, e. g., the chlorate and perchlorate anions, are strong oxidizers and their use should be avoided when an oxidizing action would effect the article adversely. Aside from such considerations, however, the choice of silver compound which can be employed as a source of silver is practically unlimited so long as the compound is soluble in an aqueous solution of the basic nitrogen compound employed. Such silver compounds include the highly water-soluble silver salts such as silver nitrate, silver perchlorate, silver fluoride and the like; the moderately or slightly water-soluble silver salts, such as silver sulfate, silver propionate, silver acetate, silver chlorate and the like; and the normally substantially water-insoluble silver salts, such as silver chloride, silver bromide, silver phosphate, silver un- decylenate, silver chromate, silver dichromate, silver cyanide, silver thiocyanate, silver benzoate, silver citrate and the like.

In a preferred modification of the invention, the silver salt employed as the source of silver is the identical silver compound which it is desired to co-precipitate on the surfaces of the article and, for reasons which will be clear as the description proceeds, the silver compound used in such instances is preferably selected from the group consisting of silver chloride, silver bromide and silver phosphate with silver chloride being the most preferred.

A wide variety of basic nitrogen compounds are suitable for inclusion in the treating solution. For practical reasons, and because a large excess of the basic nitrogen compound over that required to form the silver ammino cation is used, the preferred basic nitrogen compound is selected from the group consisting of ammonia and the water-soluble aliphatic amines. Aliphatic amines which are satisfactory for use include methyl amine, diethyl amine, tributyl amine, hexyl amine and the like. Insofar as is known, any aliphatic primary, secondary or tertiary amine which is soluble in water and which forms a water-soluble silver complex compound can be used, especially those having alkyl radicals with not more than six carbon atoms in the radical. For economic and other reasons, the basic nitrogen compound employed is generally ammonia, although the invention is not thus limited.

The compounds which can be used for supplying the cations and anions of the substantially water-insoluble compound of the metal other than silver can be selected from a wide range of substances, due regard being given, of course, to the actual substantially water-insoluble compound of the metal other than silver which it is desired to co-precipitate with the substantially water-insoluble silver compound. The compound furnishing the cation of the metal other than silver can, as noted previously, be included either in the first or the second solution. Such cations include barium, calcium, strontium, magnesium, cerium and many others, the nature of which will be apparent as the description proceeds. It is even possible in certain instances to use heavy metal cations, usch as those of zinc, aluminum and the like. When a white treated article is desired, it is, of course, advisable to avoid the use of a colored metal cation. When the first aqueous solution contains the cation of the metal other than silver, it is only necessary that the compound be soluble in the aqueous solution containing the basic nitrogen compound and the compound furnishing the silver. As pointed out previously, the compound employed to furnish the metal cations other than silver can, in most instances, contain the anion of the desired substantially water-insoluble silver compound and this is often preferred. When the cation of the metal other than silver is to be employed in the second aqueous solution, the only restriction, aside from that of coloring or otherwise affecting adversely the article which is to be treated, is that the compound employed be soluble in water. Specific water-soluble compounds which can be employed in the first or second aqueous solutions to furnish the cation of the metal other than silver include calcium chloride, barium nitrate, magnesium sulfate, aluminum chloride, calcium nitrate, zinc chloride and many others.

The compound employed to furnish the anion of the substantially water-insoluble salt of the metal other than silver can also be selected from a wide range of substances, it being only necessary that it furnish the desired anion and that it be soluble in the particular one of the first or second aqueous solutions in which it is desired to incorporate it. The compound furnishing the anion should, of course, be selected with due regard to the cation of the metal other than silver used to insure that the cation and anion form a suitable water-insoluble salt which is effective in protecting the substantially water-insoluble silver compound in the co-precipitate from the effects of light. Compounds which can be employed satisfactorily are those which furnish the phosphate, sulfate or silicate anions, and the like. Generally speaking, the anion thus furnished is, for economic reasons and because of the high degree of effectiveness of compounds containing it, selected from the group consisting of the phosphate and sulfate anions.

It can be seen readily from the foregoing that the process of the invention is capable of considerable flexibility insofar as the particular substances and combinations thereof used in making up the first and second solutions are concerned. This is illustrated in the following tabulation in which there are given some representative combinations of substances which can be employed when the co-precipitate to be formed is a mixture of silver chloride and barium sulfate, and the basic nitrogen compound employed is ammonia, it being understood that the tabulation is in no wise to be considered as limiting.

REPRESENTATIVE FIRST AND SECOND SOLUTIONS

|     | First Solution | Second Solution |
| --- | --- | --- |
| (a) | ammonia<br>silver nitrate<br>barium nitrate | sodium chloride.<br>sodium sulfate. |
| (b) | ammonia<br>silver nitrate<br>ammonium sulfate | sodium chloride.<br>barium nitrate. |
| (c) | ammonia<br>silver nitrate<br>ammonium chloride<br>barium nitrate | sodium sulfate. |
| (d) | ammonia<br>silver nitrate<br>sodium chloride<br>sodium sulfate | barium nitrate. |
| (e) | ammonia<br>silver sulfate | sodium chloride.<br>barium nitrate. |
| (f) | ammonia<br>silver sulfate<br>sodium chloride | barium nitrate. |
| (g) | ammonia<br>silver chloride<br>barium nitrate | sodium sulfate. |
| (h) | ammonia<br>silver chloride<br>sodium sulfate | barium nitrate. |
| (i) | ammonia<br>silver sulfate | barium chloride. |

As indicated previously, the process is carried out by wetting the article which is being treated with the first aqueous solution and subsequently with the second aqueous solution. It is sometimes advisable to drain or squeeze at least a part of the excess of the first solution from the article when a dipping procedure is followed to prevent mixing of undue amounts of the first solution with the second solution in the dipping vessel containing the latter. In many instances it is preferable to spray or pad the respective solutions on the article, using just enough of each to contain the desired amounts of the various substances. In this way there is generally little or no problem of mixing of the two solutions in the dipping vats or of recovering silver from residual solutions or drainage from the article. Any method for applying first and second solutions to the article which is suitable in the particular instance involved can be employed.

It is impossible to define with any degree of exactness either the concentrations of the various soluble substances in the first and second solutions used or the amount of either solution which is generally employed in treating an article. It is apparent that the amount of solution which can be retained by a given article will depend to a great extent upon the nature of the article and upon its prior treatment. Fibrous articles, such as fabrics and paper, may frequently retain from as low as 25% or less to as high as 100% or 200%, or even more, of their dry weight of solution, depending upon the amount of solution used and the degree of squeezing following dipping. Articles having relatively non-absorbent surfaces, such as many solid articles, may retain only enough solution to wet their surfaces. Generally speaking, the concentration of the solutions and the rates of their application are generally controlled so that the treated article, if a cellulosic fibrous article, contains from about 0.002% to 0.1% of its dry weight of the sparingly water-soluble silver compound, although higher or lower proportions than these can be employed if desired.

The proportion of sparingly water-soluble silver compound deposited in the co-precipitate is also subject to considerable variation without departing from the spirit of the invention. Here again it is impossible to give any definite proportions which will include all cases because of the varying natures of the articles which can be treated and because of the varying proportions of the insoluble salt of the metal other than silver which may be required to be in the co-precipitate to effectively shield the silver compound from the action of light. The conditions under which the article is to be used are also factors. Generally speaking, however, the proportions of the soluble substances in the two solutions and the rates of employment of the two solutions are adjusted so that the co-precipitate contains from about one-half to about twenty-five times as much by weight of the compound of the metal other than silver as it does of the silver compound, although these proportions are not to be taken as limiting.

For most economical operation, the concentrations in the respective solutions of the cations and anions of the salt of the metal other than silver which is to be co-precipitated with the silver salt and the proportions of the solutions themselves which are employed in wetting the article are such that the cations and anions referred to are deposited on the article in approximately stoichiometric proportions. The proportions of the silver compound used in making the first solution and of the compound furnishing the anions of the sparingly water-soluble silver salt which is to be co-precipitated are generally regulated so that the latter is deposited on the article being treated in an amount more than that chemically equivalent to the silver deposited. This not only insures the most economical utilization of the silver but it also appears that under such conditions sparingly soluble silver compound is deposited in a form which is somewhat more light-stable than when only a chemically equivalent proportion of the anion with respect to the silver is deposited. However, the invention is not limited in this respect.

The basic nitrogen compound is included in the first solution at a concentration which is somewhat dependent upon the particular sparingly water-soluble silver salt which is to be co-precipitated upon the article being treated and upon the concentration of the other soluble substances in the solutions. In the event the first solution contains the anions of a sparingly water-soluble silver salt, e. g. when silver chloride is employed in making up the first solution, sufficient of the basic nitrogen compound is included in the solution to prevent the precipitation of the insoluble silver salt. It also appears to be desirable that sufficient of the basic nitrogen compound be deposited on the article being treated to prevent the precipitation of the silver salt until the wetting operations have been completed and the step of removing the basic nitrogen compound is begun. It is obvious that the actual proportion of basic nitrogen compound which must be included in the first solution will be influenced to a considerable extent by the nature and concentrations of the other soluble substances involved as well as by other variable factors in the process.

It should be pointed out, additionally, that for best results the nature of the actual sparingly water-soluble silver salt which is deposited on the article is of considerable importance. Thus it has been noted that silver sulfide, which is soluble in water to the extent of about 0.00002% by weight, appears to be insufficiently soluble to exert any appreciable bactericidal effect. This may be related to the low degree of ionization of the sulfide.

On the other hand, the solubility of silver sulfate, which is soluble in water to the extent of about 0.5% by weight, appears to be such that if this compound is deposited as the sparingly water-soluble silver salt, it is readily removed by leaching after a few launderings or washings with hot water. For these reasons, the sparingly water-soluble silver compound which is co-precipitated on the article being treated is herein defined as a compound having a solubility in water at least about as great as that of silver sulfide but less than about that of silver sulfate.

It also appears that there may possibly be some correlation between the actual solubility in water of the silver compound deposited and its light sensitivity, the more soluble compounds within the range given, such as silver orthophosphate, being somewhat more prone to become discolored by light than the less soluble compounds, such as silver chloride, even though there is little, if any, difference in germicidal effectiveness imparted to the treated article. It may also be that the size and complexity of the anion of the silver salt deposited is a factor in the light stability of the deposit. Regardless of such considerations, the preferred silver compound which is deposited when a high degree of color stability is desired is, for economic and other reasons, silver cyanide, silver thiocyanate, silver chloride or silver bromide. Of these, the chloride and thiocyanate are generally preferred.

It is known that silver salts have a certain degree of fungicidal value, especially against certain types of fungi. It is thus possible in employing the process of the invention to produce treated products which are not only bactericidal but which are also fungicidal to a marked degree. This often requires the deposition on the article of a greater proportion of the sparingly water-soluble silver salt than would otherwise be necessary if only bactericidal effects were desired. In view of the cost of silver and its compounds, this is not always desirable and, furthermore, fungicidal properties of the sparingly water-soluble silver salts are such that adequate protection against all types of fungi under the conditions most favorable for their growth may not always be obtained. For this reason, a preferred modification of the process comprises inclusion in the treating solutions previously described of a fungicidal compound which is soluble therein and which, during the operation of the process as previously described, leads to the deposition on the surfaces of the article, along with the silver, of a sparingly water-soluble substance having fungicidal properties. As will be apparent hereinafter, the fungicidal substance deposited may be chemically combined with a part or all of the silver or it may merely be deposited along with, and in addition to, the sparingly water-soluble silver compound.

In a preferred modification, the fungicidal compound incorporated in the treating solution is one which furnishes fungicidal organic anions. Such a compound can be added in an amount greater or less, on a chemically equivalent basis, than the amount of silver compound in the solution as may be required for optimum results. The compound furnishing fungicidal organic anions is generally used in addition to the previously described requisite amount of compound furnishing the halide or other inorganic anions of the sparingly water-soluble silver compound. In certain instances, the proportion of the latter can be reduced to a limited extent when a compound furnishing fungicidal organic anions is included in the solution, but such possible reduction is not generally significant.

Although the exact nature of the deposit obtained on the article when a compound furnishing fungicidal organic anions is included in the treating composition is not known with certainty, it appears that at least a part of the fungicidal anions which are retained on the surfaces of the article are sometimes in the form of a silver salt containing the anions. However, it does not appear that all of the silver in the deposit is generally present in this form, even when the amount of fungicidal organic anions retained on the article is equal to or greater than the amount chemically equivalent to the silver retained. It may be that, when using a compound furnishing fungicidal organic anions in the solution, an equilibrium is established, insofar as the deposit is concerned, between a silver compound containing the fungicidal anions and the sparingly water-soluble silver compound previously referred to, e. g., silver chloride, and that the deposit consists of a mixture of the two compounds. It may, also, be that, in part, the same type of relationship just mentioned as possibly existing between the fungicidal anions and the silver exists between the fungicidal anions and the metal other than silver. Under such conditions, the proportions of the several compounds in the deposited mixture depend, of course, upon a number of factors, including their relative solubilities and the rates of change of their solubilities in solutions of decreasing basic nitrogen compound content, e. g., during the drying step, as well as upon the actual ionic concentrations prevailing in the treating solution. Regardless of theory, the preferred modification leads to the production of a treated article which is both highly bactericidal and highly fungicidal. Generally speaking, the fungicidal qualities of the treated product are somewhat more easily destroyed by repeated washing and laundering than are the bactericidal qualities but they are, nevertheless, adequate for most purposes.

Fungicidal compounds which can be included in the solution for the purpose of furnishing sparingly water-soluble compounds having fungicidal organic anions include compounds, e. g., salts, of fungicidal organic acids and of fungicidal phenols and halo-phenols which are soluble in the solution. Compounds of fungicidal organic acids which can be employed include compounds of benzoic, salicylic, propionic, caproic, caprylic, pelargonic, undecylenic, hexanoic, sorbic and many other acids. Preferred compounds of fungicidal acids are the alkali metal and the basic nitrogen compound salts of the saturated and unsaturated aliphatic acids, particularly of undecylenic acid. Compounds of phenols and halo-phenols which can be employed are the sodium, potassium, lithium and basic nitrogen compound salts of such phenolic substances as the mono- and poly-chlorophenols, the phenylphenols and their halogen substitution products, the hydroxy- and halo-hydroxydiphenylmethanes, thiophenols and the like. Because of their ready availability and ease of handling in the process, the sodium and other alkali metal salts of the bis-(5-chloro-2-hydroxyphenyl)-methane, bis-(2-hydroxy-3,5-dichlorophenyl)-sulfide and related halophenols and halothiophenols are of particular value in the operation of the process. This preferred modification of the invention in its broadest aspect, however, includes the employment in the treating solution of substantially any compound furnishing a sparingly water-soluble compound comprising fungicidal organic anions when the basic nitrogen compound is removed as described previously.

The manipulative procedure employed in carrying out the process when a compound furnishing fungicidal organic anions is employed in the solution does not vary appreciably from the procedure employed when such a compound is not employed. The compound furnishing the fungicidal anions can be included in either the first or second solutions, provided only that it is compatible in solution with the other substances dissolved therein. It is often advisable not to include the compound furnishing cations of the metal other than silver and the compound furnishing fungicidal anions in the same solution, especially in the second solution, since these often combine to form a compound insoluble in water and, sometimes, in the aqueous basic nitrogen compound. Because of the generally somewhat lower degree of stability of the compounds in the deposit containing the fungicidal organic anions, as compared with the stability of the sparingly water-soluble silver compound, it is generally desirable to avoid drying operations wherein the treated product is heated above about 150° C. to avoid volatilization of compounds containing an appreciable proportion of the fungicidal organic anions.

Although the invention has been described as involving the coprecipitation of a sparingly water-soluble silver salt together with other substances on the surface of an article being treated, it is pointed out that such description is in no wise limiting. The mode of action of the silver salt and the reasons therefor are not clearly understood. It may be that a certain amount of the ionic constituents of the treating solutions penetrate into the interior of fibers, e. g., into the lumens of cellulosic fibers, or at least a sufficient distance below the surface of individual fibers or of non-fibrous articles and that actual formation of the sparingly water-soluble silver salt, together with other sparingly water-soluble substances, occurs in such locations where they are effectively retained mechanically and thus are not subject to removal by ordinary washing processes. It may be also, particularly in the case of cellulosic articles, that a certain amount of silver is actually retained as a result of reactions involving carboxyl radicals which are known to exist either as a part of or associated with the cellulose molecule. The present invention, however, is not concerned with such theoretical aspects and contemplates the procedures given and the results obtained, regardless of the precise reason therefor.

Although the invention has been described with particular reference to cellulosic fabrics and paper, it is pointed out that it is concerned as well with the treatment of other cellulosic and non-cellulosic fibrous and non-fibrous articles and with the treated products which result. Thus, wood pulp can be treated by the process of the invention to protect it from deterioration during storage, the microbicidal activity of the fibers generally persisting through the paper-making process so that paper made from the treated pulp embodies desirable microbicidal features. Other cellulosic substances which can be treated similarly with advantageous results, either in bulk fibrous form or in the form of articles manufactured from the fibers include linen, hemp, jute and the like. Many synthetic fibers, such as rayon, acetate, nylon and the like, and articles fabricated therefrom, can also be treated by the process advantageously. Certain modifications of the process can be employed in treating wool and other fibrous substances of animal origin.

The invention is not confined to the treatment of fibrous substances but relates as well to the treatment of moderately porous and substantially nonporous articles to render their surfaces lethal to microorganisms coming in contact with them. Such articles include those of wood, rubber, synthetic plastics and the like. Powdered materials such as pigments, dentifrice powders, talcum and dusting powders and many others can likewise be treated by the process to give products which, in addition to their normal function, exhibit effective germicidal and, if desired, fungicidal properties. By proper modifications of the process, it can be applied to the preparation of ointments, lotions and other semi-solid paste compositions.

Although the invention has been described in the treating of an article which it is desired to render both germicidal and fungicidal with particular reference to the employment of a compound furnishing fungicidal anions to impart the fungicidal properties, it should be pointed out that the invention contemplates, as well, instances wherein a compound furnishing a fungicidal cation is included in one of the solutions under conditions which lead to the deposition on the article of a compound containing the cation in fungicidally acitive form. Such fungicidal cations include zinc, copper and other fungicidal metal cations.

A compound furnishing a suitable anion for the formation on the article of a substantially water-insoluble compound of the fungicidal metal cation is included in the other solution.

In the case of zinc compounds, the resulting treated product is generally uncolored by the treatment because suitable non-colored compounds of zinc, such as the phosphate, silicate, oxide and the like, can be employed. When copper is employed as the fungicidal cation, the treated article is generally colored by the copper salt deposited on it. However, cuprous thiocyanate and other substantially water-insoluble copper salts which are essentially white or uncolored can be deposited along with the sparingly water-soluble silver salt and the advantageous fungicidal characteristics of copper imparted to the article along with the bactericidal characteristics of the silver compound.

The procedure remains essentially unchanged when employing a compound furnishing fungicidal cations and a compound furnishing anions of a substantially water-insoluble compound thereof, due regard, of course, being given to the compatibility of the particuler compounds in the solutions in which it is desired to incorporate them. Thus zinc chloride can be employed in the first solution and sodium phosphate in the second solution or sodium phosphate can be employed in the first solution and zinc chloride in the second solution, due regard being given to the presence of other substances in the respective solutions which would lead to the formation therein of an undesirable precipitate. The employment of a zinc compound when an uncolored product is desired is especially advantageous because it can also be used in its dual purpose of fungicidal agent and protective agent for the silver salt. The same is true of cuprous thiocyanate, especially where the product is to be used under essentially non-oxidizing conditions.

It is, of course, apparent that agents, such as surface active agents and the like, can be included in one or both of the treating solutions to facilitate operation of the process according to the known effects of such substances. In some instances it may even be desirable to include sizing materials, such as starch and emulsified resinous substances, in one or both of the solutions to effect sizing of the article during the treating process. In certain instances it appears that the use of such substances facilitates to some extent the retention of the co-precipitate by the article and thus increases its resistance to removal by repeated laundering.

Certain advantages of the invention are apparent from the following examples, which are given by way of illustration only and are not to be construed as limiting.

In the accompanying examples the bactericidal and fungicidal effectiveness of the treated specimens of paper or fabrics were determined by a modified agar plate method. In the method a circular test disk precisely 15 millimeters in diameter was cut from the treated sheet of paper or fabric and placed flat in contact with the surface of a sterile agar plate freshly inoculated on its surface with the test organism. After incubation, the plate was inspected. The presence of a narrow ring around the test disk free of growing organisms was interpreted as showing the toxicity of the treated disk to the organism involved. In view of the essentially insoluble nature of the microbicidal substance on the test disk, its diffusion into the agar was in all cases limited and the actual width of the ring around the disk was of little significance. When an actual measurement was recorded, it was that of the total diameter of the ring, including the 15 millimeter diameter of the test disk.

*Example 1*

Cotton cloth was dipped in a first solution containing 1 gram of silver nitrate, 50 milliliters of 28% aqua ammonia and 1 gram of sodium sulfate per liter. The cloth was then removed from the solution, squeezed under moderate pressure to remove excess solution and then dipped in a second solution containing 1 gram of calcium chloride per liter. The cloth was removed from the second solution, squeezed as before and then dried.

The appearance of the treated cloth after drying did not differ from that of the untreated cloth. A sample of the dry treated cloth discolored only very faintly when exposed to direct sunlight.

Fifteen-millimeter test disks were cut from the treated cloth, placed on inoculated agar plates and incubated. When the organism used in inoculating the plate was *M. aureus*, a clear zone free of growth of the organism remained around the disk. The diameter of the zone was 20 millimeters, including the diameter of the test disk. When the inoculating organism was *E. coli*, the diameter of the clear zone was 19 millimeters. When the inoculating organism was *B. subtilis*, the diameter of the clear zone was 18.5 millimeters.

The treated cloth retained its bactericidal effectiveness after repeated washing in hot soap solution in a home washer using a standard cycle of washing, rinsing and drying.

Example 2

A sample of cotton cloth was treated and tested as in Example 1 except that the first solution contained 1 gram of silver lactate, 50 milliliters of 28% aqua ammonia and 1 gram of barium chloride per liter and the second solution contained 1 gram of trisodium phosphate per liter. When the treated cloth was tested for bactericidal effectiveness on inoculated agar, clear areas 18 millimeters in diameter were obtained with each of the organisms referred to in Example 1. The treated cloth did not discolor after long exposure to direct sunlight.

Example 3

The procedure of Example 1 was repeated using a first solution containing 1 gram of silver chloride, 50 milliliters of 28% aqua ammonia and 1 gram of trisodium phosphate per liter and a second solution containing 1 gram of magnesium nitrate per liter. The treated cloth thus produced did not discolor when exposed to direct sunlight and, when tested on inoculated agar, gave clear zones entirely comparable to those observed in Example 2. The bactericidal effectiveness of the treated cloth and its resistance to discoloration upon exposure to direct sunlight were not changed by repeated washings in hot soap solution in a commercial home washer.

Example 4

Cotton cloth was treated according to the procedure of Example 1 using a first solution containing 1 gram of silver chloride, 50 milliliters of 28% aqua ammonia and 1 gram of calcium chloride per liter and a second solution containing 1 gram of sodium silicate, 10 grams of ammonium undecylenate and 2 milliliters of 28% aqua ammonia per liter. The treated cloth did not discolor upon prolonged exposure to direct sunlight and was both fungicidal and bactericidal.

Example 5

The procedure of Example 1 was repeated using a first solution containing 1 gram of silver sulfate and 50 milliliters of 28% aqua ammonia per liter and a second solution containing 1 gram of calcium chloride, 2 grams of a long chain alkyl amine-o-phenylphenate (a fungicide available in the trade from By-Products Processing Laboratories, Inc. under the trade name of "Phenamine") and a few drops of a commercial wetting agent, known as Tergitol 4, per liter. The treated cloth showed good bactericidal and fungicidal properties and discolored only to a very faint yellow when exposed to direct sunlight.

Example 6

The procedure of Example 1 was repeated using a first solution containing one gram of silver sulfate and 50 milliliters of 28% aqua ammonia per liter and a second solution containing 1 gram of calcium chloride and 10 grams of sodium hydroxyquinolate per liter. In this instance a yellow precipitate formed in the second solution and a certain amount of this precipitate was deposited as a yellow residue on parts of the cloth. However, the parts of the cloth which were not thus discolored remained uncolored when exposed to direct sunlight and were highly germicidal when tested according to the method of Example 1.

Example 7

The procedure of Example 1 was repeated using a first solution containing 1 gram of silver nitrate, 50 milliliters of 28% aqua ammonia and 14 grams of ammonium undecylenate per liter and a second solution containing 1 gram of barium chloride per liter. The ammonium undecylenate used in making up the first solution was from a stock solution containing a considerable excess of ammonia.

The treated cloth showed no discoloration upon exposure to direct sunlight and was both bactericidal and fungicidal when tested on inoculated agar plates.

Example 8

A product which appeared to be polymeric in nature was prepared by boiling a solution of ammonium undecylenate containing a considerable excess of ammonia. The product as prepared contained about 60% water and gave a cloudy dispersion when stirred into water. In the following example this product is referred to as "polymer A."

The procedure of Example 1 was repeated using a first solution containing 1 gram of silver sulfate, 50 milliliters of 28% aqua ammonia and 1 gram of sodium sulfate per liter and a second solution containing 1 gram of calcium chloride and 30 grams of "polymer A" per liter. The treated cloth was highly germicidal and fungicidal when tested on inoculated agar and acquired only a faint tan color when exposed to direct sunlight.

Example 9

A sample of white paper was dipped into a first solution containing 0.318 gram of silver nitrate, 0.375 gram of ammonium undecylenate and 2.0 milliliters of 28% aqua ammonia per liter. The paper was removed from the first solution, allowed to drain briefly and dipped into a second solution containing 4.59 grams of barium chloride per liter. The paper was then removed from the second solution and hung on a line to drain and dry. The paper treated in this manner did not discolor when exposed to direct sunlight and was both germicidal and fungicidal when tested on inoculated agar plates as in Example 1. In this instance the treated paper contained a co-precipitate of silver chloride and barium undecylenate.

Example 10

The procedure of Example 9 was repeated using a first solution containing 0.322 gram of silver nitrate and 0.63 gram of aqua ammonia per liter and a second solution containing 2.4 grams of barium chloride and 1.1 grams of disodium bis-(5-chloro-2-hydroxyphenyl)-methane per liter. The dry treated paper thus obtained remained undiscolored when exposed to direct sunlight and was highly fungicidal and bactericidal when tested on inoculated agar plates.

Example 11

The following pairs of complementary first and second solutions A to G, inclusive, were prepared by dissolving in one liter of water the amounts of the several substances given:

| | First solution | | Second solution | |
|---|---|---|---|---|
| A | silver chloride___grams__<br>sodium sulfate__grams__<br>aqua ammonia (28%)<br>milliliters__ | 1.0<br>0.52<br><br>50. | barium chloride_grams__ | 1.0 |
| B | silver chloride___grams__<br>barium nitrate___grams__<br>aqua ammonia (28%)<br>milliliters__ | 1.0<br>1.0<br><br>50. | sodium sulfate___grams__ | 0.52 |
| C | silver sulfate____grams__<br>aqua ammonia (28%)<br>milliliters__ | 1.0<br><br>50. | barium chloride_grams__ | 1.0 |
| D | silver sulfate____grams__<br>aqua ammonia (28%)<br>milliliters__ | 4.0<br><br>50. | barium chloride_grams__ | 1.0 |
| E | silver sulfate____grams__<br>aqua ammonia (28%)<br>milliliters__ | 8.0<br><br>50. | barium chloride_grams__ | 1.0 |
| F | silver chloride___grams__<br>zinc nitrate_____grams__<br>aqua ammonia (28%)<br>milliliters__ | 1.0<br>1.0<br><br>50. | trisodium phosphate<br>grams__ | 1.0 |
| G | silver chloride___grams__<br>trisodium phosphate<br>grams__<br>aqua ammonia (28%)<br>milliliters__ | 1.0<br><br>1.0<br><br>50. | zinc chloride____grams__ | 1.0 |

Each set of complementary first and second solutions given was used in treating separate test pieces of white cotton fabric substantially as by the method of Example 1.

In each instance the dried treated fabric was uncolored by exposure to direct sunlight and possessed bactericidal properties resistant to laundering.

We claim:
1. The method for treating an article to render it microbicidal to microorganisms coming into contact with its surface, which includes: wetting the article successively with first and second aqueous solutions, the first solution comprising a water-soluble basic nitrogen compound and a silver salt soluble in the aqueous basic nitrogen compound, one of the solutions comprising a compound furnishing anions of a sparingly water-soluble silver compound, one of the solutions comprising a compound furnishing cations of a substantially water-insoluble compound of a metal other than silver and one of the solutions comprising a compound furnishing anions of the substantially water-insoluble compound of the metal other than silver, the cations and anions of the water-insoluble compound of the metal other than silver being in different solutions; and subsequently removing basic nitrogen compound from the wetted article.

2. The method as claimed in claim 1, wherein the first aqueous solution comprises the cation and the second aqueous solution comprises the anion of the substantially water-insoluble compound of the metal other than silver.

3. The method as claimed in claim 1, wherein the first aqueous solution comprises the anion and the second aqueous solution comprises the cation of the substantially water-insoluble compound of the metal other than silver.

4. The method of claim 1, wherein the first aqueous solution comprises the anion of the sparingly water-soluble silver salt.

5. The method as claimed in claim 1 wherein the second aqueous solution comprises the anion of the sparingly water-soluble silver salt.

6. The method as claimed in claim 1, wherein the basic nitrogen compound is selected from the group consisting of ammonia and the water-soluble amines.

7. The method as claimed in claim 1 wherein the basic nitrogen compound is ammonia.

8. The method of claim 1 wherein the sparingly water-soluble silver salt has a solubility in water at least about as great as that of silver sulfide and less than about that of silver sulfate.

9. The method of claim 1 wherein the sparingly water-soluble silver salt is selected from the group consisting of silver chloride, silver bromide, silver cyanide and silver thiocyanate.

10. The method of claim 1 wherein the sparingly water-soluble silver salt is silver chloride.

11. The method of claim 1 wherein the substantially water-insoluble salt of the metal other than silver is the salt of a metal selected from the group consisting of calcium, barium, strontium, magnesium and zinc.

12. The method of claim 1 wherein the substantially water-insoluble salt of the metal other than silver is selected from the group consisting of sulfates, phosphates, silicates and oxides.

13. The method as claimed in claim 1 wherein one of the solutions comprises a compound furnishing fungicidal anions.

14. The method as claimed in claim 1 wherein one of the solutions comprises a compound furnishing anions of a fungicidal organic acid.

15. The method as claimed in claim 1 wherein one of the solutions comprises a compound furnishing anions of undecylenic acid.

16. The method as claimed in claim 1 wherein one of the solutions comprises a compound furnishing anions of a fungicidal phenol.

17. The method as claimed in claim 1 wherein one of the solutions comprises a compound furnishing anions of bis-(5-chloro-2-hydroxyphenyl)-methane.

18. The method as claimed in claim 1 wherein one of the solutions comprises a compound furnishing anions of bis-(2-hydroxy-3,5-dichlorophenyl)-sulfide.

19. The method of claim 1 wherein the basic nitrogen compound is ammonia, the sparingly water-soluble silver compound is silver chloride and the substantially water-insoluble compound of a metal other than silver is calcium sulfate.

20. The method of claim 1 wherein the basic nitrogen compound is ammonia, the sparingly water-soluble silver compound is silver chloride and the substantially water-insoluble compound of a metal other than silver is barium phosphate.

21. The method of claim 1 wherein the basic nitrogen compound is ammonia, the sparingly water-soluble silver compound is silver chloride and the substantially water-insoluble compound of a metal other than silver is magnesium phosphate.

22. The method of claim 1 wherein the basic nitrogen compound is ammonia, the sparingly water-soluble silver compound is silver chloride and the substantially water-insoluble compound of a metal other than silver is calcium silicate.

23. The method for treating an article to render it antiseptic and self-sterilizing, which includes: wetting the article with a first solution comprising a basic nitrogen compound, a silver compound and a compound furnishing an ion of a substantially water-insoluble compound of a metal other than silver; subsequently wetting the article with a second aqueous solution comprising a compound furnishing an ion, opposite in charge from the said ion of the first solution, of the substantially water-insoluble compound of the metal other than silver, one of the solutions comprising a compound furnishing the anion of a sparingly water-soluble silver compound; and subsequently removing basic nitrogen compound from the wetted article.

24. The method for treating a fibrous article to render it antiseptic and self-sterilizing, which includes: wetting the article successively with predetermined amounts of first and second aqueous solutions of predetermined compositions wherein the first solution comprises a water-soluble basic nitrogen compound and a silver salt soluble in the solution, one of the solutions comprises the anions of a sparingly water-soluble silver compound, one of the solutions comprises the cations and the other of the solutions comprises the anions of a substantially water-insoluble compound of a metal other than silver; regulating the proportions of the first and second solutions used in wetting the article to provide on the article an amount of anions of the sparingly water-soluble silver salt at least greater stoichiometrically than the silver cations thereon and to provide the cations and anions of the substantially water-insoluble compound of the metal other than silver in substantially stoichiometric proportions on the article; and subsequently removing basic nitrogen compound from the article whereby there is deposited on the article a tightly adherent, co-precipitated deposit of the sparingly water-soluble silver compound and the substantially water-insoluble compound of a metal other than silver wherein the latter functions as an effective stabilizer of the silver salt against the effect of light normally tending to discolor it.

25. The method of claim 24 wherein the amount of sparingly water-soluble silver salt co-precipitated is from about 0.002 to about 0.1 percent, calculated as silver chloride, of the dry weight of the fibrous article.

26. The method of claim 24 wherein the amount of the co-precipitated substantially water-insoluble compound of a metal other than silver is from about 0.5 to about 25 times the weight of the co-precipitated sparingly water-soluble silver salt.

References Cited in the file of this patent
UNITED STATES PATENTS

| | | |
|---|---|---|
| 2,040,806 | Feigl | May 12, 1936 |
| 2,427,022 | Russ | Sept. 9, 1947 |
| 2,689,809 | Fessler | Sept. 21, 1954 |
| 2,713,008 | Schulenberg | July 12, 1955 |

OTHER REFERENCES

"Fundamentals of Semi-Micro Qualitative Analysis." (Kelsey & Dietrich), published by the MacMillan Company (New York), 1940 (page 193 relied on).